J. REINIGER.
HARVESTER REEL TENSIONING CLAMP.
APPLICATION FILED FEB. 4, 1919.

1,307,879.

Patented June 24, 1919.

Inventor
Joseph Reiniger

By E. Hume Talbert

Attorney

UNITED STATES PATENT OFFICE.

JOSEPH REINIGER, OF CARRINGTON, NORTH DAKOTA.

HARVESTER-REEL-TENSIONING CLAMP.

1,307,879.      Specification of Letters Patent.     Patented June 24, 1919.

Application filed February 4, 1919. Serial No. 274,909.

*To all whom it may concern:*

Be it known that I, JOSEPH REINIGER, a citizen of the United States, residing at Carrington, in the county of Foster and State of North Dakota, have invented new and useful Improvements in Harvester - Reel-Tensioning Clamps, of which the following is a specification.

This invention comprehends generally improvements in that class of inventions known as harvesters and more particularly relates to a harvester reel tensioning clamp.

The invention has for its principal aim and object to provide a device of the above mentioned character designed to be mounted on the shaft of a harvester reel and positioned so as to coöperate with the reel frame in such a manner as to produce a tension on the shaft whereby to consequently cause a steady and even rotation of the reel shaft.

More particularly the present invention contemplates the provision of a device of the above mentioned character wherein a pair of clamping members are tensioned about a harvester reel shaft and arranged in abutting relation with the reel frame so as to frictionally engage the shaft to produce an even rotation thereof and prevent a back lash usually resulting from cast or worn gears, consequently insuring of the proper engagement of the reel with the grain to cause the same to fall square upon the canvas, thereby making a square bundle with the consequent saving of grain.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which.

Similar characters of reference are employed in all of the above described views, to indicate corresponding parts.

Figure 1:
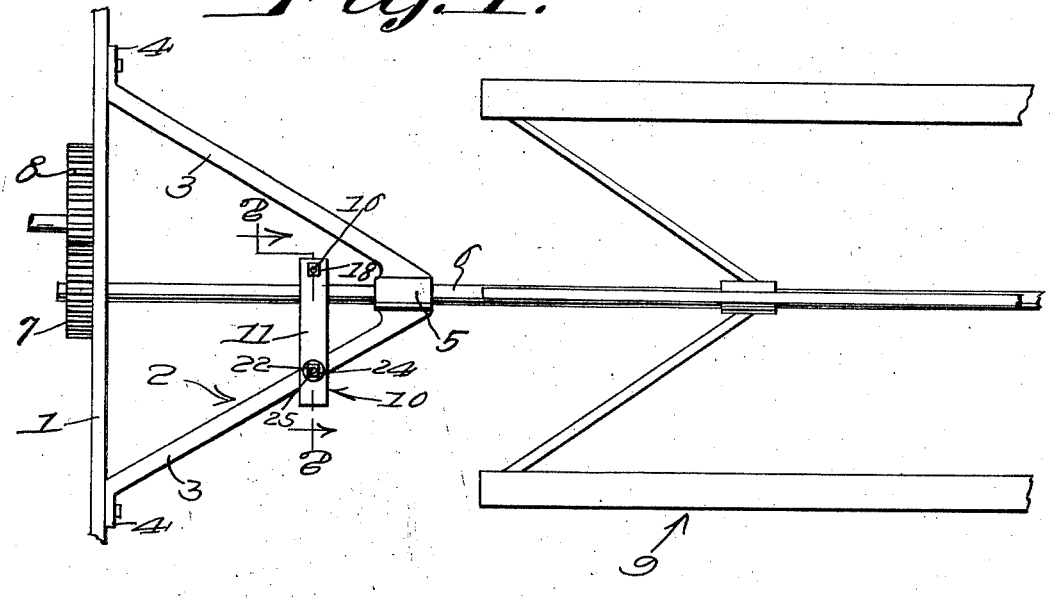
Figure 1 is a top plan view of the device applied.
Figure 2:
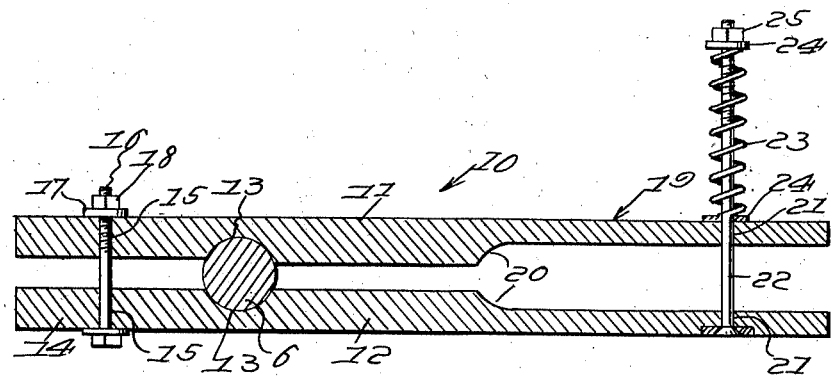
Fig. 2 is an enlarged longitudinal sectional view of the device.

Referring now, more particularly, to the accompanying drawings there is illustrated a portion of a harvester comprising a main frame 1 from which extends a reel frame 2 the latter, in the present instance, being positioned laterally of the main frame and of a substantially inverted V-shaped configuration, the side arms 3 terminating in feet 4 which are secured to the outer side of the main frame 1 while the vertex is formed with a sleeve bearing 5 through which is journaled the reel shaft 6, the extreme inner portion of the said shaft being also journaled through one side of the frame. A pinion 7 is connected to the inner end of the shaft 6 and meshes with the rotatable gear 8 forming a part of the transmission mechanism which assures of the rotation of the shaft 6 simultaneously with the forward movement of the harvester to consequently cause the reel 9 carried by the outer end of the shaft 6 to rotate. Operably mounted on the shaft 6 and coacting with the frame 2 is the improved tensioning clamp generally indicated by the numeral 10 and this clamp is desirably employed when the gears 7 and 8 are loosely meshed with each other which loosely meshed engagement is caused by the employment of cast gears or occurs when the gears have become worn, said clamps preventing a back lash of the harvester reel 9 and at the same time assuring of the steady and even rotation thereof so that the grain which is pinned down by the reel will be subsequently cut evenly so that it may finally fall and lie evenly upon the canvas conveyer (not shown).

In the present instance, the improved tensioning clamp may be said to consist of complemental clamping members 11 and 12 formed of wood or other suitable material and of elongated rectangular configuration. These members are formed on their adjacent faces and near one end with transverse grooves 13 for disposition upon the upper and lower faces of the inner portion of the shaft 6. The short portions 14 from the sides of the grooves 13 are formed with opposed openings 15 through which is disposed a bolt 16 engaged by a washer 17 and a nut 18 the latter serving to coöperate with the bolt in holding the members 11 and 12 together. The adjacent faces on the long portion 19 of the members 11 and 12 are inclined as at 20 toward the free ends and the said portions 19 are formed near their free ends with opposed openings 21 in which is mounted an elongated bolt 22.

A coil spring 23 is now disposed about the projecting end of the elongated bolt 22 and has its respective ends arranged against washers 24 which are also disposed on the bolt. A tensioning nut 25 is engaged on the extreme outer portion of the bolt 22 and bears against the adjacent washer 24 for controlling the tension of the spring 23 and for consequently tensioning the members 11 and 12 relative to each other and to the shaft 6 causing a frictional engagement between the members at the grooves 13 and the shaft 6. As indicated the members 11 and 12 are of sufficient length so that the lower member 12 abuts one of the sides 3 of the frame 2 and during the rotation of the shaft, of course, the clamp is held substantially stationary, while the frictional engagement is maintained between the members and the shaft to consequently insure of the steady and even rotation of the shaft 6.

After several seasons' use, the gears, couplings, and pins of a binder will become worn, thereby giving the reel a great deal of play, so that the sprocket reel is permitted to move a considerable distance before the reel is started. Thus the reel is caused to move intermittently first making a revolution and then stopping until all the back lash is taken up when it will start on a second revolution with a jerk and then run ahead and so on. Such a jerky motion of the reel will not tip the grain gently but will drive it end over end back on the platform where it will run too far back to get over the band and needle of the binder. The function of the tensioning clamp above set forth is to neutralize the bad effects of this back lash and the clamp serves to keep the reel moving substantially at a uniform angular velocity when the grain is caught gently and tipped evenly so as to fall square upon the platform in a square bundle thus providing for the most effective operation of the binder with a resultant increase in the saving of the grain.

It is believed in view of the foregoing description that a further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

What is claimed is:

1. The combination with the shaft of a harvester reel and a supporting frame therefor through which the shaft is journaled, of a clamp embodying a pair of complemental members having transverse grooves in their adjacent faces for disposition upon opposite sides of the shaft, means for adjustably connecting the adjacent inner ends of the members together, one of the members being designed to abut the reel frame, and a resilient connection between the opposite portions of the members for insuring of the frictional contact of the members with the shaft.

2. The combination with a harvester reel shaft and a supporting frame through which the shaft is journaled, of a clamp embodying a pair of complemental members having transverse grooves in their adjacent faces and near one end, a connection between the short portions of the members, the outer portion of one of the members being arranged in abutting relation with the reel frame, an elongated bolt loosely arranged through the long portions of the members, a spring disposed about the projecting end of the bolt, and an adjusting element engaged on the bolt for regulating the tension of the spring and controlling the frictional engagement between the members and the shaft.

In testimony whereof I affix my signature.

JOSEPH REINIGER.